V. M. Thomas.
Culinary App's.

No. 80,315.  Patented Jul. 28, 1868.

Witnesses,
George Ward
J. L. Hawkins

Inventor.
Volney M. Thomas

United States Patent Office.

VOLNEY M. THOMAS, OF BRANDON, VERMONT.

Letters Patent No. 80,315, dated July 28, 1868.

IMPROVEMENT IN CULINARY APPARATUS.

*The Schedule referred to in these Letters Patent and making part of the same.*

TO ALL WHOM IT MAY CONCERN:

Be it known that I, VOLNEY M. THOMAS, of Brandon, in the county of Rutland, in the State of Vermont, have invented certain new and useful Improvements in Culinary Apparatus; and I do hereby declare that the following is a full, clear, and exact description of the same, reference being had to the accompanying drawings, making a part of this specification, in which—

Figure 1:
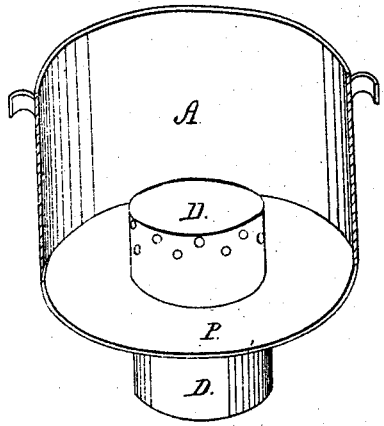

Figure 1 is a vertical side view, with the side of the steam-chamber open, so as to show the conducting-pipe.

Figure 2:
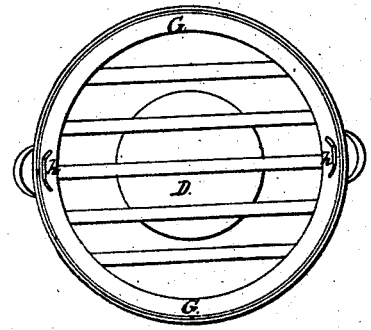

Figure 2, a horizontal plan, showing the position of the grate.

Figure 3:
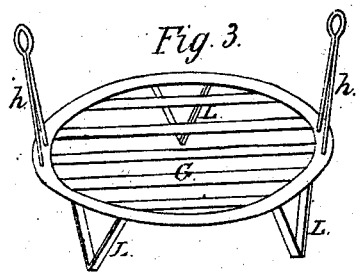

Figure 3, a perspective view of the grate.

Figure 4:
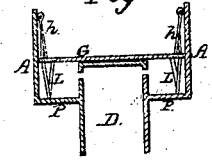

Figure 4, a section, showing the position of the grate inside the steamer; and

Figure 5:
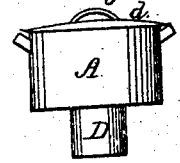

Figure 5 an outside view of the steamer with the cover on.

This invention consists in providing a steamer, for steaming bread or other food, constructed so as to fit into an open tea-kettle, and conduct the steam from the boiling water therein to the interior of the steamer, where the food is placed; also to collect the water of condensation, and prevent its running back into the kettle; also in providing a raised grate, upon which to place the food to be steamed.

In the drawings, A is the main body of the steamer, and may be called the steam-chamber. D is the conducting-pipe or cylinder, which conveys the steam from the kettle to the steam-chamber A, and is closed at the top, but perforated near the top, to let the steam pass into the steam-chamber. This conducting-pipe is inserted into the bottom of the steam-chamber, projecting above and below, and is soldered tight, so that the bottom of steam-chamber A may be water-tight.

The grate G, having legs L L L and handles $h\ h$, fits into the steam-chamber A, immediately over the top of the conducting-pipe D.

When the steamer is placed over the kettle of boiling water, with the lid $d$ (fig. 5) on, the steam passes up through the conducting-pipe D, and out of the perforations, near the top thereof, into the steam-chamber A, where it comes in contact with the food.

The water of condensation, instead of running back into the tea-kettle, and carrying with it the impurities arising from the cooking food, settles upon the bottom of the steam-chamber A.

The grate G raises the food above the conducting-pipe D, where the steam may act freely upon all sides of it, and is so constructed that it may easily be taken out and kept perfectly clean.

Having thus described my invention, what I claim, and desire to secure by Letters Patent, is—

The arrangement and combination of the steam-chamber A, conducting-pipe D, and grate G, when constructed and operating substantially as and for the purposes herein set forth.

VOLNEY M. THOMAS.

Witnesses:
 GEORGE WARD,
 J. Q. HAWKINS.